(12) United States Patent
Pearce

(10) Patent No.: US 9,487,130 B1
(45) Date of Patent: Nov. 8, 2016

(54) DUAL VEHICULAR BRAKE SWITCH WITH FLASHER UNIT

(71) Applicant: Steven Pearce, Burbank, CA (US)

(72) Inventor: Steven Pearce, Burbank, CA (US)

( * ) Notice: Subject to any disclaimer, the term of this patent is extended or adjusted under 35 U.S.C. 154(b) by 0 days.

(21) Appl. No.: 14/729,159

(22) Filed: Jun. 3, 2015

(51) Int. Cl.
    *B60Q 1/44* (2006.01)

(52) U.S. Cl.
    CPC .................................... *B60Q 1/444* (2013.01)

(58) Field of Classification Search
    CPC ........ B60Q 1/445; B60Q 1/444; B60Q 1/44; B60Q 1/52; B60Q 1/447; B60Q 1/441
    USPC ........................................................ 340/479
    See application file for complete search history.

(56) References Cited

U.S. PATENT DOCUMENTS

| | | | |
|---|---|---|---|
| 2,751,458 A | 6/1956 | Kayuha, Jr. | |
| 3,219,775 A * | 11/1965 | Carpenter | B60Q 1/441 200/553 |
| 3,740,715 A | 6/1973 | Szekessy | |
| 4,871,945 A | 10/1989 | Smith | |
| 4,918,424 A * | 4/1990 | Sykora | B60Q 1/441 200/61.89 |
| 5,504,472 A | 4/1996 | Wilson | |
| 5,594,416 A | 1/1997 | Gerhaher | |
| 5,606,310 A * | 2/1997 | Egger | B60Q 1/441 340/463 |
| 5,736,926 A * | 4/1998 | Winholtz | B60Q 1/0023 340/467 |
| 5,952,917 A | 9/1999 | Zimmermann | |
| 6,445,289 B1 | 9/2002 | Roberts | |
| D552,041 S | 10/2007 | Brickley | |
| 2010/0102946 A1* | 4/2010 | Polak | B60Q 1/525 340/467 |
| 2011/0012725 A1* | 1/2011 | Foreman | B60Q 1/44 340/467 |

* cited by examiner

*Primary Examiner* — Don N Vo

(57) ABSTRACT

The dual vehicular brake switch with flasher unit is a brake switch with a dual stage design. When a brake pedal is pressed normally, the brake lights turn on normally. However, when the brake is pressed hard, a second switch activates which puts the brake lights (or an alternate lighting system) into a flashing or strobe mode. The dual vehicular brake switch with flasher unit comprises a housing, an acceleration sensor, a brake switch, a flasher switch, and a plurality of electrical connections.

7 Claims, 6 Drawing Sheets

DUAL VEHICULAR BRAKE SWITCH WITH FLASHER UNIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of motor vehicle brakes, more specifically, a switch configured for use in hard braking situations.

SUMMARY OF INVENTION

The dual vehicular brake switch with flasher unit is a brake switch with a dual stage design. When a brake pedal is pressed normally, the brake lights turn on normally. However, when the brake is pressed hard, a second switch activates which puts the brake lights (or an alternate lighting system) into a flashing or strobe mode.

These together with additional objects, features and advantages of the dual vehicular brake switch with flasher unit will be readily apparent to those of ordinary skill in the art preferred, but nonetheless illustrative, embodiments when taken in conjunction with the accompanying drawings.

In this respect, before explaining the current embodiments of the dual vehicular brake switch with flasher unit in detail, it is to be understood that the dual vehicular brake switch with flasher unit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dual vehicular brake switch with flasher unit.

It is therefore important that the claims be regarded as including such equivalent construction insofar as they do not depart from the spirit and scope of the dual vehicular brake switch with flasher unit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description meant to be exemplary illustrations provided to enable persons skilled in the art to practice the disclosure and are not intended to limit the scope of the appended claims.

DETAILED DESCRIPTION OF THE EMBODIMENT

Figure 1:
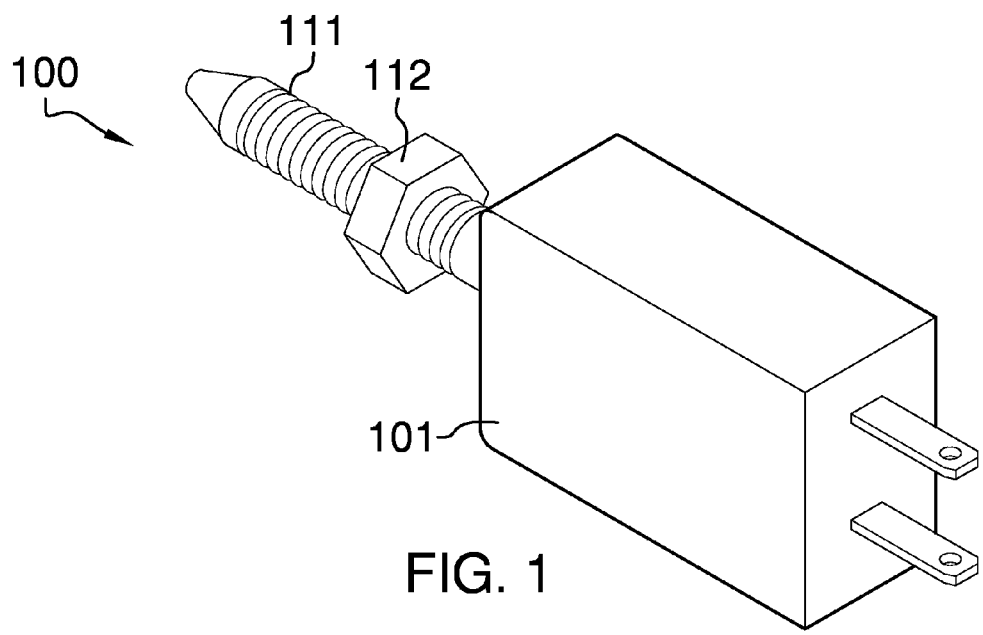
FIG. 1 is a perspective view of an embodiment of the disclosure.
Figure 2:
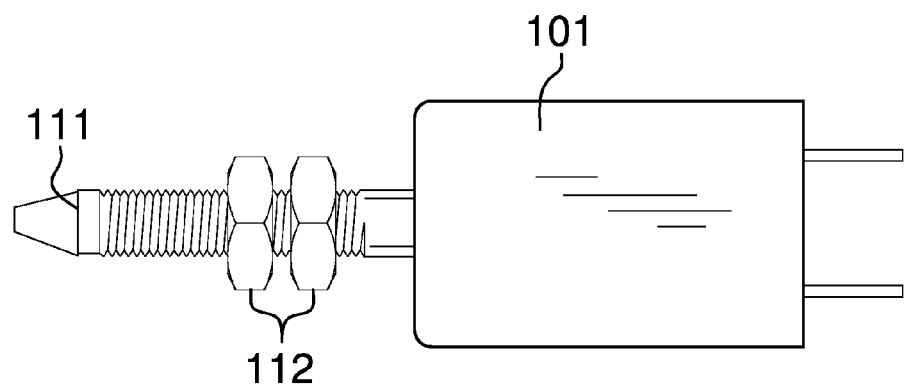
FIG. 2 is a front view of an embodiment of the disclosure.
Figure 3:
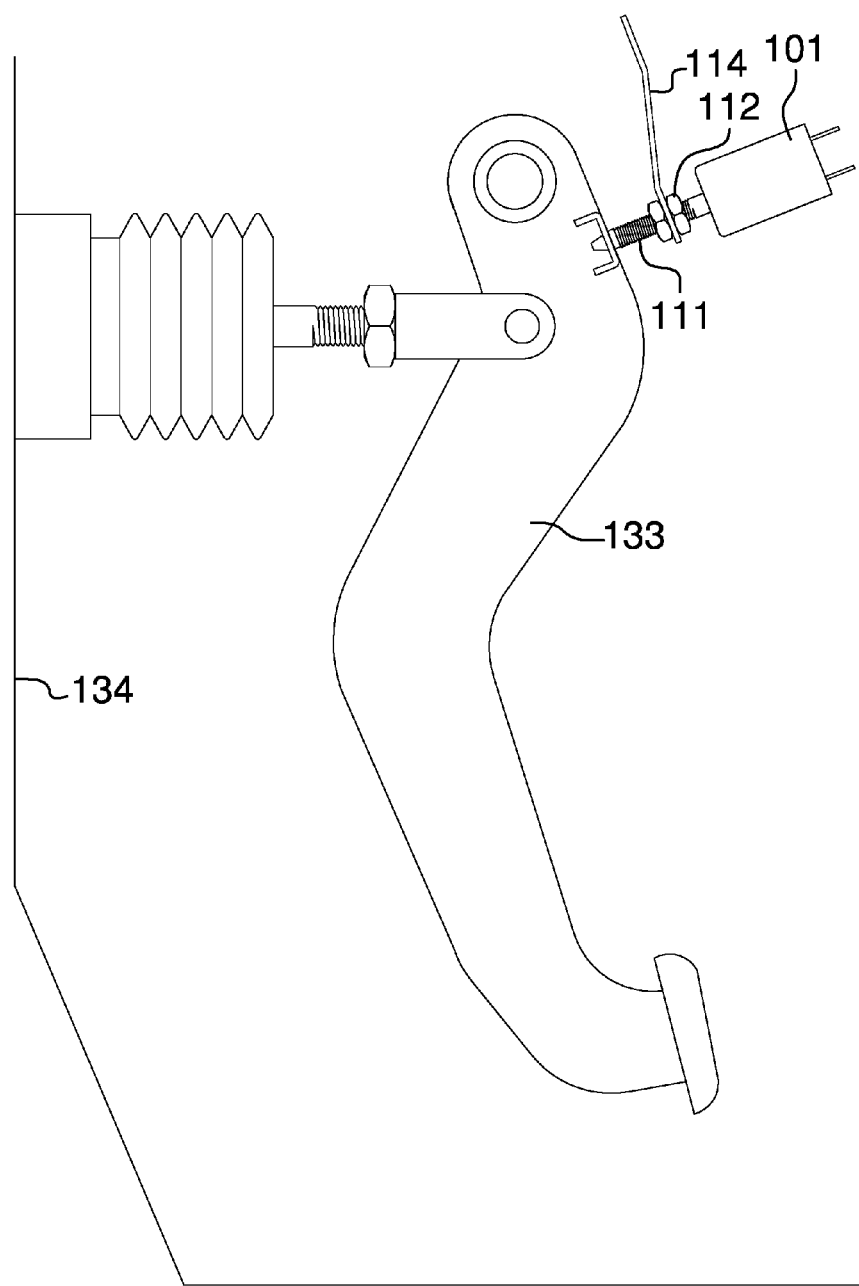
FIG. 3 is an in use view of an embodiment of the disclosure.
Figure 4:
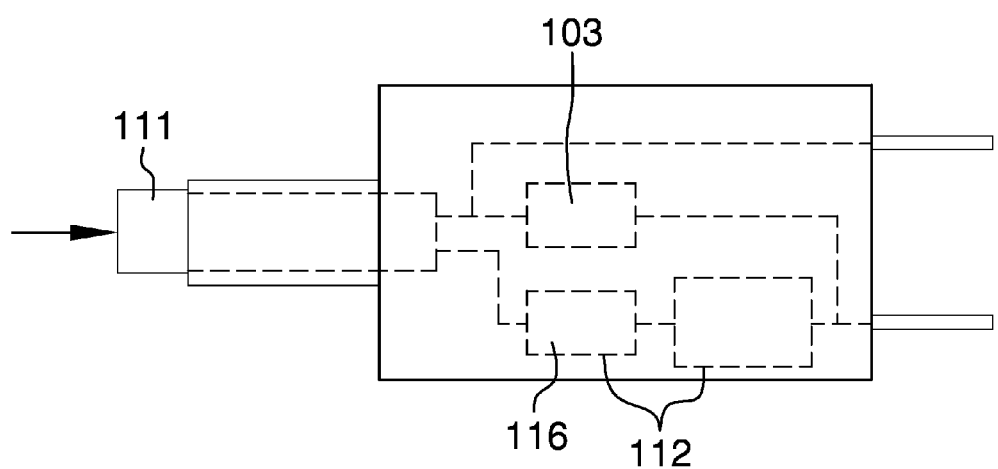
FIG. 4 is a block diagram of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 7. The dual vehicular brake switch with flasher unit 100 (hereinafter invention) comprises a housing 101, a flasher circuit 102, and a brake switch 103.

The housing 101 comprises a brake connector 111, a locking nut 112, a rigid box 113, and a switch mount bracket 114. The purpose of the rigid box 113 is to contain the acceleration sensor 115, brake switch 103, and a flasher switch 116. The brake connector 111 is a bolt that projects out of the rigid box 113 and is adaptively connected to the brake pedal 133. The end of the brake connector 111 that is distal from the brake pedal 133 is attached to the brake switch 103. When the brake pedal 133 is depressed, the brake connector 111 moves with the brake pedal 133 and causes the brake switch 103 to close, which illuminates the brake lights 131.

The housing 101 is held in place using the switch mount housing 101 to a frame 177 of the automobile 134. The switch mount bracket 114 is held in place by the locking nut 112. The locking nut 112 is a nut that resists loosening when in a vibrating environment.

The theory of operation of the invention 100 is a follows. When the brakes are applied, the brake switch 103 closes which lights the brake lights 131. When the brake switch 103 is closed, a flasher circuit 102 is also powered. The flasher circuit 102 further comprises an acceleration sensor 115 and a flasher switch 116. If the acceleration sensor 115 detects deceleration forces that are beyond a predetermined threshold, the acceleration sensor 115 activates the flasher switch 116.

Figure 5:
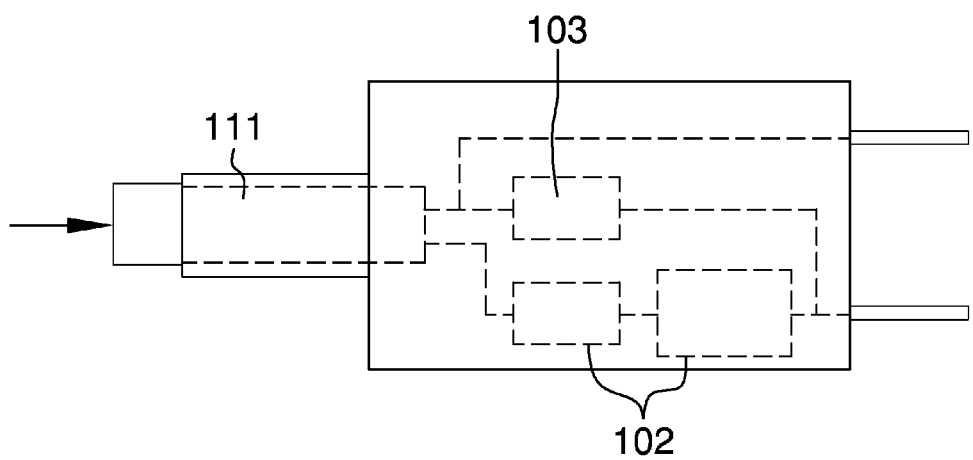
FIG. 5 is an electric schematic of an embodiment of the disclosure.
Figure 6:
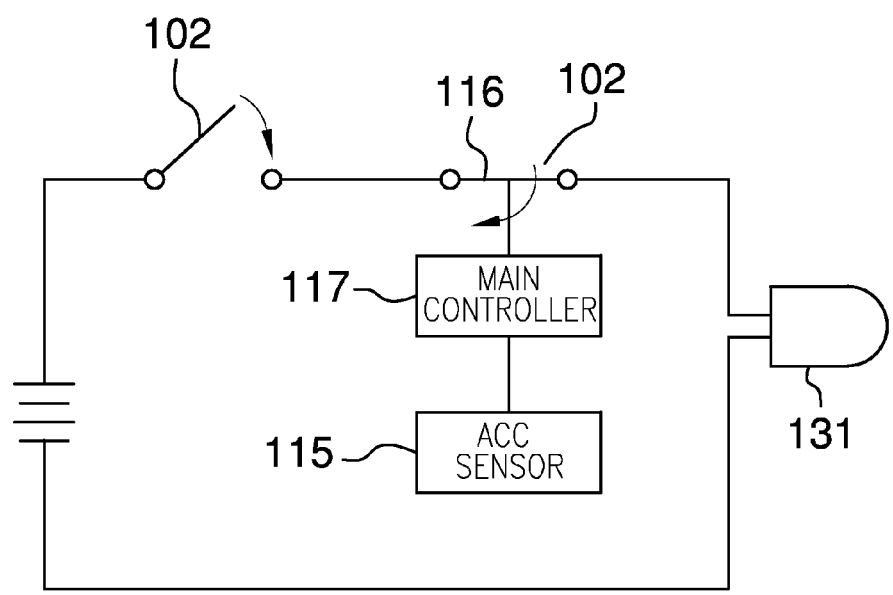
FIG. 6 is an electric schematic of an embodiment of the disclosure.
Figure 7:
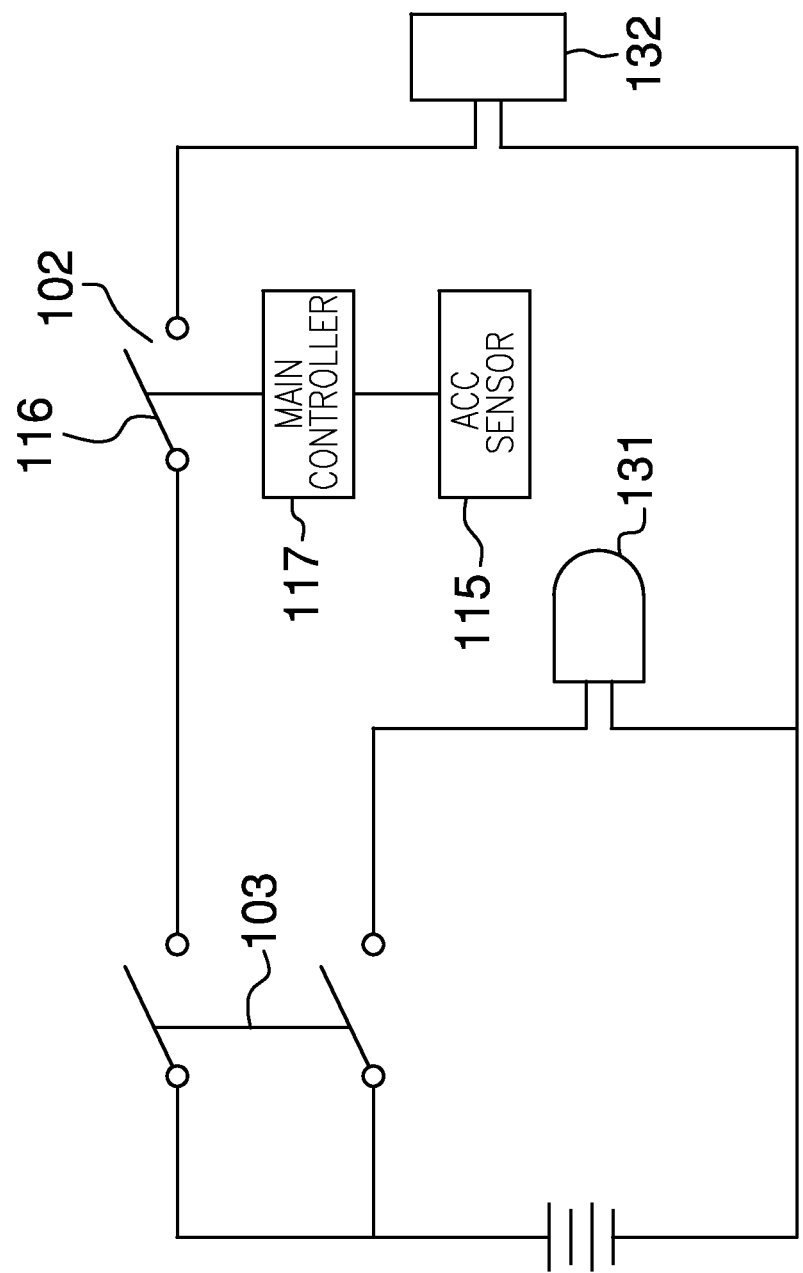
FIG. 7 is an electric schematic of an embodiment of the disclosure.

In the first potential embodiment of the disclosure, as shown in FIG. 5, the flasher switch 116 is placed in the brake lights 131 circuit. In this scenario, the acceleration sensor 115 is designed to open and close the flasher switch 116 so as to cause the brake lights 131 flash on and off during braking. The purpose of this flashing is to warn the driver in the vehicle directly behind the automobile 134 that the automobile 134 is sharply braking. Once the foot is taken off the brake pedal 133, the power to the flasher circuit 102 is interrupted ending the flashing.

In the second potential embodiment of the disclosure, as throw switch. When the brake switch 103, the brake lights 131 operate as normal. In addition the second pole of the brake switch 103 closes which enables power to the flasher switch 116. In this scenario, when the acceleration sensor 115 detects deceleration forces that are beyond a predetermined threshold the acceleration sensor 115 closes the flasher switch 116. Closing the flasher switch 116 powers a commercially available strobe light 132 adapted for automobiles 134. The purpose of this flashing is to warn the driver in the vehicle directly behind the automobile 134 that the automobile 134 is sharply braking. Once the foot is taken off the brake pedal 133, the power to the flasher circuit 102 is interrupted stopping the strobe.

In the first potential embodiment of the disclosure and the second potential embodiment of the disclosure, the acceleration sensor 115 is a commercially available accelerometer integrated into a microcontroller system 117, such as an Arduino system. The microcontroller system 117 is used to monitor the acceleration measured by the accelerometer. Should the accelerometer measure an acceleration lesser than −0.35 g, a deceleration indicative of hard braking, the microcontroller system 117 is used to power a relay that is used to control the flasher switch 116. In the first embodiment of the disclosure, closing the flasher switch 116. In the second embodiment of the disclosure, the microcontroller system 117 is responsible for closing the flasher switch 116 and the strobe light 132 is responsible for flashing the lights.

To use the invention 100, the driver needs to drive normally. Should the automobile 134 be in a severe braking situation, the acceleration sensor 115 will detect the situation and enable the flashing of lights as determined by the first potential embodiment of the disclosure or the second potential embodiment of the disclosure.

Microcontroller systems, automotive strobe units, switches, and mounting hardware are readily and commercially available. The use of microcontroller systems, automotive strobe units, switches, and mounting hardware are well known and documented in the art.

The following definitions were used in this disclosure:

Automobile: As used in this disclosure, an automobile is a road vehicle that is powered by an internal combustion engine.

Microcontroller: As used in this disclosure, a microcontroller is a small computer, often on a single integrated circuit, containing a processor core, memory, and programmable input/output peripherals.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A switching system for brake lights comprising:
a flasher circuit and a brake switch;
wherein the switching system is adapted for use with automobile brakes;
wherein the brake switch illuminates brake lights of the automobile when the brake pedal is depressed;
wherein the brake switch enables the flasher circuit when the brake pedal is depressed;
wherein the flasher circuit further comprises an acceleration sensor;
wherein the flasher circuit further comprises a flasher switch;
wherein when the acceleration sensor detects deceleration forces that are beyond a predetermined threshold the acceleration sensor activates the flasher switch;
wherein the flasher switch flashes the brake lights on and off;
wherein the acceleration sensor is an accelerometer integrated into a microcontroller system;
wherein the switching system further comprises a housing;
wherein the housing further comprises a brake connector, a locking nut, a rigid box, and a switch mount bracket;
wherein the rigid box contains the acceleration sensor, the brake switch, and a flasher switch;
wherein the brake connector is a bolt that is projects out of the rigid box and is connected to the brake pedal.

2. The switching system according to claim 1 wherein the end of the brake connector that is distal from the brake pedal is attached to the brake switch;
wherein when the brake pedal is depressed, the brake connector moves with the brake pedal and causes the brake switch to illuminate the brake lights.

3. The switching system according to claim 2 wherein the switch mount bracket is used to attach the housing to the frame of the automobile.

4. The switching system according to claim 3 wherein the switch mount bracket is held in place by the locking nut.

5. A switching system for brake lights comprising:
a flasher circuit and a brake switch;
wherein the switching system is adapted for use with automobile brakes;
wherein the brake switch illuminates brake lights of the automobile when the brake pedal is depressed;
wherein the brake switch enables the flasher circuit when the brake pedal is depressed;
wherein the flasher circuit further comprises an acceleration sensor;
wherein the flasher circuit further comprises a flasher switch;
wherein when the acceleration sensor detects deceleration forces that are beyond a predetermined threshold the acceleration sensor activates the flasher switch;
wherein the flasher switch operates a strobe light adapted for use with automobiles;
wherein the acceleration sensor is an accelerometer integrated into a microcontroller system;
wherein the switching system further comprises a housing;
wherein the housing further comprises a brake connector, a locking nut, a rigid box, and a switch mount bracket;
wherein the rigid box contains the acceleration sensor, the brake switch, and a flasher switch;

wherein the brake connector is a bolt that is projects out of the rigid box and is connected to the brake pedal
wherein the end of the brake connector that is distal from the brake pedal is attached to the brake switch;
wherein when the brake pedal is depressed, the brake connector moves with the brake pedal and causes the brake switch to illuminate the brake lights.

6. The switching system according to claim 5 wherein the switch mount bracket is used to attach the housing to the frame of the automobile.

7. The switching system according to claim 6 wherein the switch mount bracket is held in place by the locking nut.

* * * * *